Feb. 24, 1942. A. L. STEWART 2,273,908
GEAR CUTTER
Filed May 21, 1940 2 Sheets-Sheet 1

INVENTOR
ARTHUR L. STEWART
BY
ATTORNEY

Feb. 24, 1942. A. L. STEWART 2,273,908

GEAR CUTTER

Filed May 21, 1940 2 Sheets-Sheet 2

INVENTOR
ARTHUR L. STEWART
BY
B. E. Schlesinger
ATTORNEY

Patented Feb. 24, 1942

2,273,908

UNITED STATES PATENT OFFICE 2,273,908

GEAR CUTTER

Arthur L. Stewart, Rochester, N. Y., assignor to Gleason Works, Rochester, N. Y., a corporation of New York Application May 21, 1940, Serial No. 336,419

4 Claims. (Cl. 29—105)

The present invention relates to the production of gears and particularly to the cutting of longitudinally curved tooth gears such as spiral bevel and hypoid gears of the "Formate" (non-generated) type. The invention comprises a novel form of cutter, a novel gear cutting method, and a novel gear cutting machine. This application is a division of my co-pending application, Serial No. 284,697, filed July 15, 1939. It is confined to the novel form of cutter.

In the cutting of all except the very smallest sizes of spiral bevel and hypoid gears, it is ordinary practice to rough-cut the gears in one operation and then to finish-cut the roughed blanks in a separate operation. This procedure, of course, produces the highest grade of work but it requires two set-ups, two operations, and on high production jobs especially, two separate machines and two separate tools.

One object of the present invention is to provide a simple and inexpensive type of cutter which may be used for successively rough-cutting and finish-cutting spiral bevel and hypoid gears in a single operation, with a single set-up and on a single machine.

Other objects of the invention will be apparent hereinafter from the specification and from the recital of the appended claims.

Figure 1:
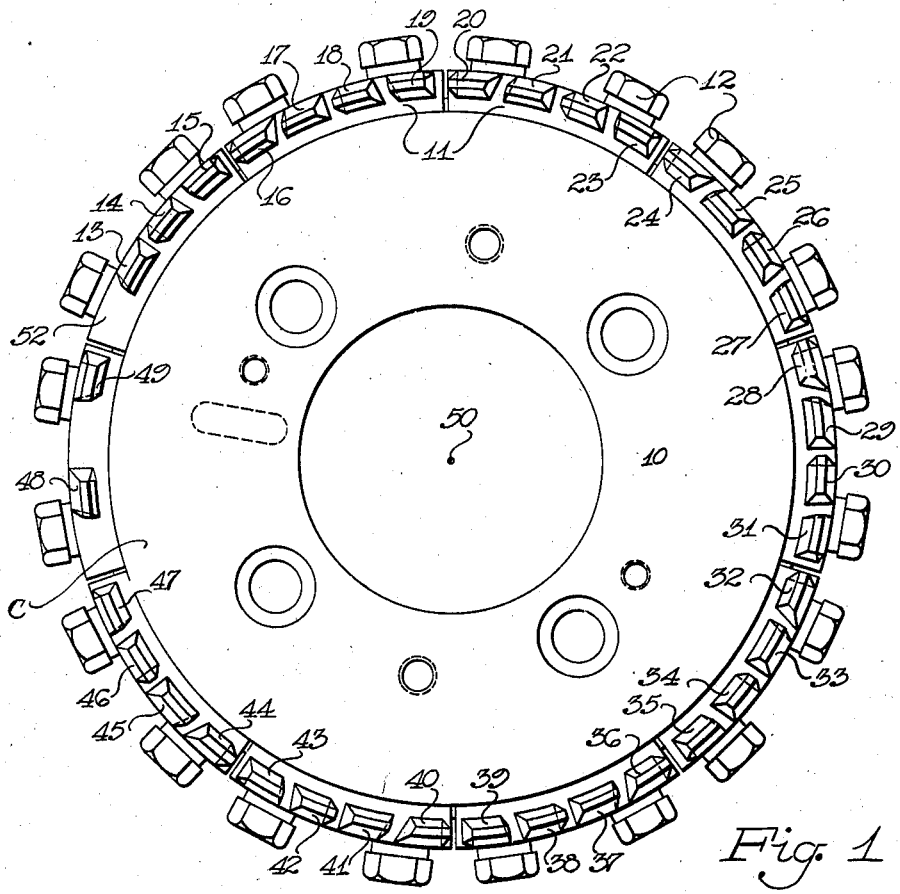
Fig. 1 is a plan or face view of a face-mill gear cutter constructed according to one embodiment of the present invention.
Figure 2:
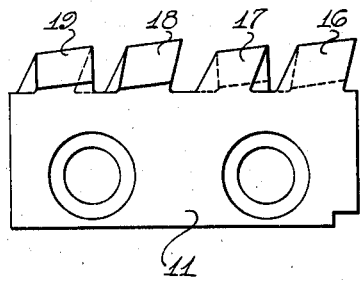
Fig. 2 is a developed side view of one of the cutting segments of this cutter.

In the cutting of spiral bevel and hypoid gears according to the present invention, a cutter of the face-mill type is employed that has a plurality of roughing blades followed circumferentially by one or more finishing blades. The finishing blades are arranged preferably at the same radial distance from the axis of the cutter as are the roughing blades and may be identical in construction with the roughing blades or at least with the side-cutting blades of the roughing group.

The invention is particularly applicable to the cutting of gears in an intermittent indexing process. In the cutting of each tooth space of a gear blank, the cutter is rotated in engagement with the blank and simultaneously a relative step-by-step depthwise feed movement is produced between cutter and blank until the tooth space is cut to full depth. The cutter makes several revolutions in the cutting of a tooth space. On each revolution, while the roughing blades are moving across the face of the blank, a continuous feed is effected so that successive roughing blades cut progressively deeper into the tooth space. On all except the last revolution of the cutter, however, the feed movement is interrupted and a slight relative withdrawal of the cutter is effected when the finishing blades are passing across the face of the blank. This slight relative withdrawal serves to prevent the finishing blades from cutting. On the final revolution of the cutter, after the tooth space has been roughed out to full depth, the withdrawal is omitted. The cutter is allowed to dwell at full depth as the finishing blades move across the face of the blank and they then cut on the opposite sides of the tooth space, producing the final finished sides of the tooth space. The cutter is then withdrawn from engagement with the blank and the blank is indexed. The operation proceeds as before for the cutting of the next tooth space and alternate cutting and indexing proceed until the gear is completed.

The point-width of the roughing blades is preferably chosen to equal the width of the tooth spaces to be cut and the finishing blades then have only to clean up the sides of the tooth space left by the roughing blades. Since the finishing blades cut the tooth space only on the last revolution of the cutter, their cutting edges are kept keen and, when they are called upon to cut, will produce final finished tooth surfaces of the smoothness and quality desired. Since a tooth space of a gear is roughed for a portion of its depth on each revolution of the cutter and is roughed to full depth and finished on the last revolution of the cutter, it will be seen that the cutting operation of the present invention is very fast.

Reference will now be had to the drawings for a more detailed description of the invention.

10 denotes the body or head of a face-mill gear cutter constructed according to one embodiment of this invention. This cutter is of the segmental type and has a plurality of segments 11 secured to its periphery by bolts 12. There are a plurality of cutting blades formed integral with each of the segment. In the embodiment shown, each segment is formed with four cutting blades except the first and last segments. The first segment is provided with three cutting blades and the last segment with two. The cutting blades are here numbered at 13 to 49 inclusive. The blades 13 to 47 inclusive are roughing blades and the blades 48 and 49 are finishing blades.

The roughing blades of the cutter may be made according to known practice. Each of the blades may be sharpened so that it cuts on the two sides of a tooth space simultaneously, or alternate blades may be sharpened to cut, respectively, on opposite sides of the tooth space. Preferably, however, the roughing blades are constructed as in the cutter of the pending application of Arthur L. Stewart and Allan H. Candee, Serial No. 15,410, filed April 9, 1935. This is the construction illustrated in the drawings of the present application. The roughing blades then comprise separate side-cutting and bottom-cutting blades. The side-cutting blades preferably alternate, as shown, with the bottom-cutting blades and moreover, alternate side-cutting blades are preferably sharpened to cut on opposite sides of a tooth space. The even-numbered blades 14, 16, 18, etc. are bottom-cutting blades. The odd-numbered blades 13, 15, 17, etc. are side-cutting blades. Every fourth roughing blade 13, 17, 21, etc. is an inside-cutting blade and every fourth blade 15, 19, 23 etc. is an outside-cutting blade.

The side and bottom-cutting blades may be proportioned exactly as described in the Stewart and Candee application. Thus the bottom-cutting blades are made of greater height than the side-cutting blades so that they project axially of the cutter beyond the side-cutting blades and the opposite sides of the bottom-cutting blades are preferably made of less pressure angle than the corresponding sides of the side-cutting blades. The bottom-cutting blades may be sharpened with a hook to cut on both sides while the inside and outside cutting blades will be sharpened with oppositely directed front rake, respectively.

The roughing blades are so arranged that corresponding side-cutting blades have their side-cutting edges all at the same radial distance from the axis of the cutter. Thus the inside cutting edges of the inside cutting blades are all at the same radial distance from the axis 50 of the cutter. Likewise, the outside cutting edges of the outside cutting blades are all arranged at the same radial distance from the axis 50 of the cutter. The distance between the outside and inside cutting edges determines the width of the roughed tooth slot to be cut and, as already stated, this point-width is preferably selected to equal approximately the finished width of the tooth space. The point-width of the bottom-cutting blades may be the same as that of the side-cutting blades but preferably will be slightly less.

The sides and tops of both the side and bottom-cutting blades are relieved on their sides and tops back of their side and top-cutting edges to provide cutting clearance. Construction of the roughing blades 13 to 47 inclusive is the same, then, as in the cutter described in the Stewart and Candee application.

The finishing blades 48 and 49 are inside and outside cutting blades, respectively. These blades may be identical, respectively, with the inside and outside roughing blades being of the same pressure angle and height. Moreover, their radial positions may be the same, respectively, as the corresponding side-cutting roughing blades although the finishing blades may be made of slightly greater point-width if desired. In the latter case, however, a greater withdrawal movement of the cutter is required, on each roughing revolution of the cutter, to keep the finishing blades from cutting.

While the roughing blades are spaced uniformly from one another, as close together as is possible and still provide chip clearance, the inside finishing blade 48 is preferably spaced from the immediately preceding roughing blade 47 a distance greater than the face-width of the gear to be cut and similarly the outside finishing blade 49 is preferably spaced from the immediately preceding blade 48 a distance greater than the face-width of the gear to be cut. The described arrangement of the finishing blades will insure that only one blade will be in a tooth space of the gear blank when the finishing blades are in operation. This insures that the finishing blades will take clean, smooth cuts, unaffected by the action of any of the other blades.

A gap 52 is provided between the final finishing blade 49 and the first roughing blade 13. This gap is of sufficient angular extent to permit of the slight axial movement of the cutter required to return the cutter to roughing depth from the withdrawn position that it has occupied while the finishing blades are passing across the face of the blank. Thus, when the first roughing blade 13 is rotated into position again it may cut deeper into the tooth space.

The cutter described may be used on known types of gear cutting machines to practice the present invention provided a suitable feed cam is employed on the machine used. A gear roughing machine such as described in the United States patent of Schauseil et al. No. 2,044,485 of June 16, 1936, may be employed, for instance, to practice the present invention by using a cutter made according to this invention on the machine and providing the machine with a proper feed cam.

Figure 4:
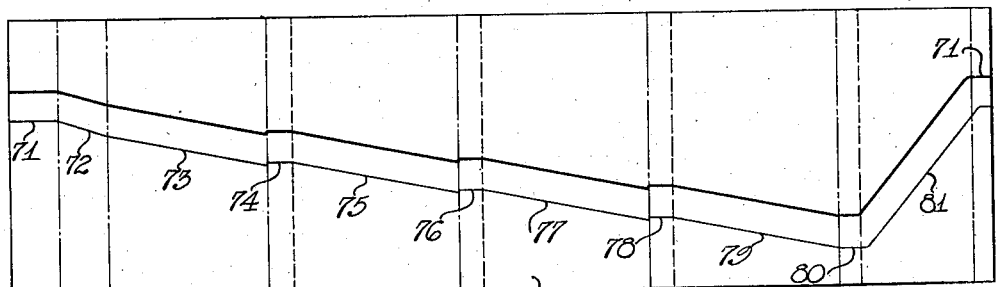
Fig. 4 is a developed view of one type of feed cam which may be used on the machine for practicing the present invention.

A feed cam such as is required is illustrated in Fig. 4 at 70'. This cam is intended to be used where a tooth space of the gear, that is to be cut, may be roughed to full depth in four revolutions of the cutter, the cutter roughing about one-fourth of total depth on each revolution. The track of this cam is provided with a dwell portion at 71, a portion 72 for rapid advance or feed, a portion 73 with a somewhat slower advance or feed, a short withdrawal and dwell portion 74, another feed or advance portion 75, a second short withdrawal and dwell portion 76, another feed or advance portion 77, a third withdrawal and dwell portion 78, a final advance or feed portion 79, a dwell portion 80, and a full withdrawal portion 81.

Figure 3:
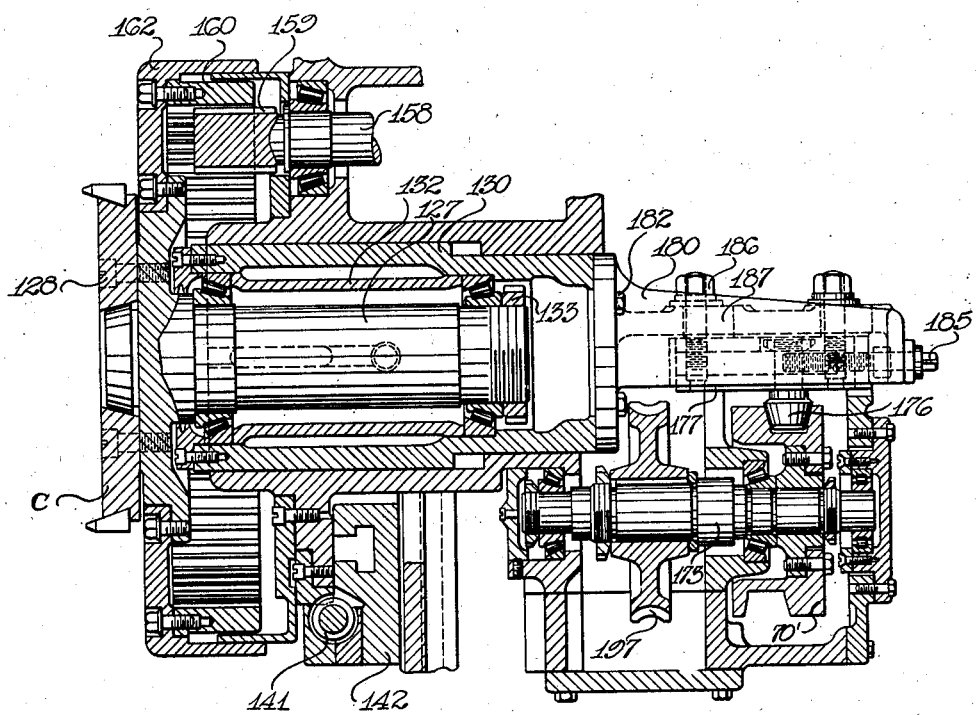
Fig. 3 is a fragmentary sectional view of the cutter end of a known type of spiral bevel gear cutting machine showing how the cutter of the present invention may be employed in practicing this invention.

With a cutter C of proper construction, such as shown in Fig. 1, secured to the tool spindle and with a feed cam of proper construction such as shown in Fig. 4, mounted in position, the parts of the machine of the Schauseil et al. patent may be operated exactly as described in that patent to practice the present invention. In Fig. 3, a sectional view of the cutter end of the Schauseil et al. machine is shown with the cutter C and the feed cam 70' mounted thereon. The various parts which are illustrated and which are identical with the parts shown in the Schauseil et al. patent are identified by the same reference numerals as are employed in the Schauseil et al. patent with the exception that these reference numerals are increased by 100. Thus, the cutter spindle, which is denoted at 27 in the Schauseil et al. patent is here designated at 127.

In the Schauseil et al. machine the cutter spindle 127 may be driven by the spur pinion 159 and the internal gear 160 in time with the feed cam 70' and in time, also, with the cam which operates the indexing mechanism of the machine. As the feed cam 70' is rotated by the wormwheel 197, it is adapted to impart axial movement to the cutter spindle 127. It engages the roller or follower 176 which is secured in a block 177 that is adjustably mounted in a bracket 180 which is secured by bolts 182 to the sleeve 130 in which the cutter spindle 127 is journaled.

After the cutter has been adjusted into correct relation with the gear blank to be cut, the machine may be started. As the cutter C and the feed cam 70' rotate in timed relation, the cutter will first be fed rapidly toward the gear blank by operation of the portion 72 of the cam slot. The rapid feed continues until the cutter comes into operative relation with the blank. Then the rate of the feed movement will be reduced and, as the roughing blades 13 to 47 inclusive successively take their cuts, will be controlled by the portion 73 of the cam. During this first passage of the roughing blades through the tooth space of the blank, the tooth space will be cut to one-fourth its depth. Then, after the last roughing blade 47 has taken its cut and before the first finishing blade 48 is rotated into cutting position, the cutter will be slightly withdrawn by operation of the portion 74 of the cam slot and the cutter will be held in a slightly withdrawn position while the finishing blades 48 and 49 are passing through the tooth space so that these blades will not cut. As soon as the blade 49 has passed through the tooth space, the feed movement will commence anew under control of the portion 75 of the cam slot and will continue as the roughing blades 13 to 47 inclusive again successively rotate into cutting position so that on the second revolution of the cutter the tooth space of the blank is roughed by the successive roughing blades to half its depth. Again, just after the roughing blade 47 has taken its cut and before the first finishing blade 48 has rotated into cutting position, the cutter will be withdrawn axially by operation of the portion 76 of the cam slot and the cutter will be held in withdrawn position while the finishing blades 48 and 49 are again passing through the tooth space. As soon as the blade 49 has passed through the tooth space, the feed will begin anew under control of the portion 77 of the cam slot and the roughing blades will again be fed deeper and deeper into the tooth space to rough the space on this third revolution of the cutter to three-fourths of its full depth. Again, however, on this third revolution of the cutter before the finishing blade 48 can cut, the cutter will be withdrawn axially under control of the portion 78 of the cam slot and held in withdrawn position until the finishing blades 48 and 49 have passed across the face of the blank. On the fourth revolution of the cutter which, for the cam 70' illustrated, is the final revolution for a tooth space, the roughing blades will be fed on into full depth position under control of the portion 79 of the cam slot. On this revolution of the cutter, however, instead of withdrawing the cutter axially, the cutter is allowed to dwell at full-depth cutting position, after the last roughing blade 47 has finished its cut. When the finishing blades 48 and 49 rotate into position, then, they will cut, respectively, on the opposite sides of the tooth space of the blank, cleaning up the roughed sides of the space and producing fine finished side surfaces. Immediately after the blade 49 has taken its cut, on this fourth revolution of the cutter, the cutter is withdrawn axially from the tooth space at a very rapid rate under control of the portion 81 of the cam slot. This withdrawal continues until the cutter spindle has returned axially to initial position. Then, while the dwell portion 71 of the cam is in engagement with the cam roller 176, the work spindle is indexed.

During the withdrawal and dwell under control of the portions 81 and 71 of the cam slot, the cutter may make a complete revolution. In any event, the cutter rotation will be so timed to the rotation of the feed cam that when the feed movement begins anew, the first roughing blade 13 of the cutter will be the first to cut in the new tooth space of the blank. The alternate cutting of the tooth spaces and the indexing of the blank continues until the gear is finished.

In the illustrated embodiment of the invention, there are four feed portions 73, 75, 77 and 79 provided in the slot of the cam 70' so that the cutter will be fed into full depth position in four revolutions. It will be obvious that by proper formation of the cam slot, any other number of revolutions may be imparted to the cutter per tooth space as may be required to take out the stock from the tooth space for any desired job. It will be obvious, also, that instead of actually withdrawing the cutter on all but the last revolution, that on each revolution while the finishing blades are passing across the face of the blank the cutter may be allowed to dwell at the axial depth to which it has previously been fed. The amount of stock removed by the finishing blades at any time is not very great and the slight cuts that might be taken by these blades on each revolution of the cutter, if the feed cam were so constructed, would not dull them very rapidly. It will be obvious, also, that instead of providing the cam with a dwell portion 80, to be operative while the finishing blades are cutting, the cam may be constructed so that it produces a slight advance or feed movement during operation of the finishing blades. This may be desirable to permit the finishing blades to cut chips of sufficient thickness to leave a smooth surface. In this event, a dwell portion may be provided in the cam to be operative during the last revolution of the roughing blades so as to secure the greatest accuracy in tooth spacing.

While the invention has been described in connection with a particular structure of cutter, it will be understood that the invention is capable of further modification and this application is intended to cover any variations, uses, or adaptations of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. A face-mill gear cutter comprising a rotary head and a plurality of roughing and finishing blades which are secured to the head to project beyond one side face of the head in the general direction of the axis of the head, the roughing blades being equi-distantly spaced from one another a distance less than the face-width of the gear to be cut, and each finishing blade being spaced from the preceding blade a distance greater than the face-width of the gear to be cut, opposite side-cutting edges of the finishing blades being arranged at the same radial distance, respectively, from the axis of the cutter as corresponding side-cutting edges of the roughing blades, and there being a gap between the last finishing blade and the first roughing blade which is sufficient to permit slight axial withdrawal of the cutter as it revolves on its axis, but which is insufficient for indexing of the gear blank.

2. A face-mill gear cutter comprising a rotary head and a plurality of roughing blades followed by a plurality of finishing blades which project beyond one side face of the head in the general direction of the axis of the head, the roughing blades being spaced from one another a distance less than the face-width of the gear to be cut and each finishing blade being spaced from the preceding blade a distance greater than the face-width of the gear to be cut, corresponding side-cutting edges of the roughing blades having the same inclination to the axis of the cutter and the same profile shape and height, and the opposite side-cutting edges of the finishing blades having the same height, inclination and profile shape as the corresponding side-cutting edges of the roughing blades, and there being a gap between the last finishing blade and the first roughing blade which is sufficient to permit slight axial withdrawal of the cutter as it revolves on its axis, but which is insufficient for indexing of the gear blank.

3. A face-mill gear cutter comprising a rotary head and a plurality of cutting blades which project beyond one side face of the head in the general direction of the axis of the head, certain of the blades being roughing blades and others of the blades being finishing blades, the roughing blades comprising both bottom-cutting and side-cutting blades and the bottom-cutting blades alternating with opposite side-cutting blades, the finishing blades comprising side-cutting blades only, all the side-cutting blades being of the same height and having their corresponding side-cutting edges inclined at the same angle to the axis of the cutter, and the bottom-cutting blades projecting axially beyond the side-cutting blades and having their opposite side-cutting edges inclined to the axis of the cutter at angles less than the angles of inclination of the corresponding side edges of the side-cutting blades, each finishing blade being spaced from the preceding blade a distance greater than the face-width of the gear to be cut, and there being a gap between the last finishing blade and the first roughing blade which is sufficient to permit slight axial withdrawal of the cutter but which is insufficient to permit indexing the gear blank.

4. A face-mill gear cutter comprising a rotary head and a plurality of roughing blades followed by a plurality of finishing blades which are secured to the head to project beyond one side face of the head in the general direction of the axis of the head, the roughing blades being spaced from one another a distance less than the face-width of the gear to be cut, and each finishing blade being spaced from the preceding blade a distance greater than the face-width of the gear to be cut, the roughing blades comprising both bottom-cutting and opposite side-cutting blades, and the bottom-cutting blades alternating with opposite side-cutting roughing blades, the finishing blades comprising opposite side-cutting blades only, all of the side-cutting blades being of approximately the same height and having their corresponding side-cutting edges inclined at the same angle to the axis of the cutter and located at the same radial distance from the axis of the cutter, and the bottom-cutting blades projecting axially beyond the side-cutting blades and having their opposite side edges inclined to the axis of the cutter at an angle less than the angle of inclination of the corresponding side edges of the side-cutting blades, and there being a peripheral gap between the last finishing blade and the first roughing blade which is sufficient to permit slight axial withdrawal of the cutter as it revolves in engagement with a gear blank but which is insufficient to permit of indexing the blank.

ARTHUR L. STEWART.